(12) United States Patent
DiMarco

(10) Patent No.: US 7,712,973 B2
(45) Date of Patent: May 11, 2010

(54) FIBER OPTIC CONNECTOR

(75) Inventor: Brian Anthony DiMarco, Greenville, SC (US)

(73) Assignee: FiberSource, Inc., Greenville, SC (US)

( * ) Notice: Subject to any disclaimer, the term of this patent is extended or adjusted under 35 U.S.C. 154(b) by 0 days.

(21) Appl. No.: 12/204,349

(22) Filed: Sep. 4, 2008

(65) Prior Publication Data

US 2010/0054669 A1    Mar. 4, 2010

(51) Int. Cl.
G02B 6/36 (2006.01)
(52) U.S. Cl. ........................... 385/81; 385/98
(58) Field of Classification Search ................ 385/53, 385/55, 56, 69
See application file for complete search history.

(56) References Cited

U.S. PATENT DOCUMENTS

| | | | | |
|---|---|---|---|---|
| 3,559,698 A | * | 2/1971 | Smith .......................... | 140/105 |
| 3,768,146 A | * | 10/1973 | Braun et al. .................. | 29/460 |
| 3,914,015 A | | 10/1975 | McCartney | |
| 3,972,585 A | * | 8/1976 | Dalgleish et al. .............. | 385/70 |
| 3,999,837 A | | 12/1976 | Bowen et al. | |
| 4,033,668 A | * | 7/1977 | Presby ......................... | 385/95 |
| 4,148,553 A | * | 4/1979 | Asam .......................... | 385/85 |
| 4,179,186 A | * | 12/1979 | Tynes .......................... | 385/98 |
| 4,201,444 A | * | 5/1980 | McCartney et al. ........... | 385/64 |
| 4,205,896 A | * | 6/1980 | Borsuk ........................ | 385/84 |
| 4,336,977 A | * | 6/1982 | Monaghan et al. ............ | 385/87 |
| 4,353,620 A | * | 10/1982 | Schultz ........................ | 385/70 |
| 4,368,948 A | * | 1/1983 | Despouys ..................... | 385/87 |
| 4,383,736 A | * | 5/1983 | Forman ....................... | 29/871 |
| 4,406,515 A | * | 9/1983 | Roberts ....................... | 385/72 |
| 4,435,038 A | * | 3/1984 | Soes et al. .................... | 385/70 |
| 4,458,985 A | * | 7/1984 | Balliet et al. ................. | 385/65 |
| 4,486,072 A | * | 12/1984 | Roberts ....................... | 385/64 |
| 4,513,171 A | * | 4/1985 | Suffi et al. .................... | 174/41 |
| 4,567,650 A | * | 2/1986 | Balyasny et al. .............. | 29/822 |
| 4,674,833 A | * | 6/1987 | Des Forges et al. ........... | 385/85 |
| 4,718,745 A | * | 1/1988 | Strait, Jr. ..................... | 385/64 |
| 4,749,253 A | * | 6/1988 | Dean et al. .................... | 385/70 |
| 4,834,487 A | * | 5/1989 | Abendschein et al. ........ | 385/78 |
| 4,923,274 A | * | 5/1990 | Dean ........................... | 385/72 |
| 4,969,705 A | | 11/1990 | Stoy et al. | |
| 5,054,868 A | | 10/1991 | Hoban et al. | |
| 5,102,212 A | * | 4/1992 | Patterson ..................... | 385/98 |
| 5,159,655 A | * | 10/1992 | Ziebol et al. ................. | 385/81 |
| 5,179,608 A | * | 1/1993 | Ziebol et al. ................. | 385/81 |

(Continued)

FOREIGN PATENT DOCUMENTS

GB    2095780 A    * 10/1982

(Continued)

*Primary Examiner*—Frank G Font
*Assistant Examiner*—Peter Radkowski
(74) *Attorney, Agent, or Firm*—John B. Hardaway, III; Nexsen Pruet, LLC

(57) ABSTRACT

A connector for fiber optic cable comprising a one-piece body having a plurality of holes in a first end dimensioned to receive an optical fiber and reinforcing members. The connector comes preassembled with a ferrule connector at the opposing end. The first end has a slot therein dividing the first end and holes into two halves. A crimp sleeve is crimped to the connector body, compressing the first end of the connector body and thereby gripping the reinforcing members. Reinforcing fibers are crimped between the connector body and crimping sleeve.

20 Claims, 5 Drawing Sheets

U.S. PATENT DOCUMENTS

| | | | |
|---|---|---|---|
| 5,208,887 A | 5/1993 | Grinderslev | |
| 5,217,207 A | 6/1993 | Schmader et al. | |
| 5,440,665 A | 8/1995 | Ray et al. | |
| 5,528,718 A | 6/1996 | Ray et al. | |
| 5,657,413 A | 8/1997 | Ray et al. | |
| 5,805,757 A * | 9/1998 | Bloom | 385/137 |
| 5,806,175 A * | 9/1998 | Underwood | 29/748 |
| 5,845,026 A * | 12/1998 | Lee et al. | 385/58 |
| 5,894,536 A | 4/1999 | Rifkin et al. | |
| 5,915,055 A * | 6/1999 | Bennett et al. | 385/59 |
| 5,917,975 A * | 6/1999 | Bloom | 385/78 |
| 5,971,624 A * | 10/1999 | Giebel et al. | 385/59 |
| 5,999,684 A * | 12/1999 | Bloom | 385/137 |
| 6,104,846 A | 8/2000 | Hodgson et al. | |
| 6,116,788 A * | 9/2000 | Melchior et al. | 385/59 |
| 6,174,424 B1 | 1/2001 | Wach et al. | |
| 6,275,642 B1 * | 8/2001 | Pouyez et al. | 385/137 |
| 6,276,840 B1 * | 8/2001 | Weiss et al. | 385/59 |
| 6,282,348 B1 * | 8/2001 | Carlisle et al. | 385/78 |
| 6,326,550 B1 | 12/2001 | Dyer et al. | |
| 6,349,572 B1 * | 2/2002 | Meinl et al. | 65/410 |
| 6,357,928 B1 * | 3/2002 | Haley et al. | 385/59 |
| 6,379,054 B2 * | 4/2002 | Throckmorton et al. | 385/66 |
| 6,390,688 B1 * | 5/2002 | Lutzen et al. | 385/87 |
| 6,416,234 B1 | 7/2002 | Wach et al. | |
| 6,429,373 B1 | 8/2002 | Scrimpshire et al. | |
| 6,434,317 B1 | 8/2002 | Dyer et al. | |
| 6,491,445 B1 * | 12/2002 | Abendschein | 385/87 |
| 6,498,882 B1 | 12/2002 | Buckelew et al. | |
| 6,604,861 B2 * | 8/2003 | Chen et al. | 385/56 |
| 6,623,174 B2 * | 9/2003 | Perko et al. | 385/78 |
| 6,763,166 B2 * | 7/2004 | Yow et al. | 385/114 |
| 6,775,458 B2 * | 8/2004 | Yow et al. | 385/137 |
| 6,829,424 B1 | 12/2004 | Finzel et al. | |
| 6,832,032 B2 | 12/2004 | Simmons et al. | |
| 6,860,645 B2 * | 3/2005 | Miller et al. | 385/81 |
| 7,090,406 B2 | 8/2006 | Melton et al. | |
| 7,090,407 B2 | 8/2006 | Melton et al. | |
| 7,111,990 B2 | 9/2006 | Melton et al. | |
| 7,266,274 B2 | 9/2007 | Elkins, II et al. | |
| 7,311,449 B2 * | 12/2007 | Barnoski et al. | 385/78 |
| 7,346,243 B2 | 3/2008 | Cody et al. | |
| 2002/0114581 A1 * | 8/2002 | Chen et al. | 385/56 |
| 2002/0159711 A1 * | 10/2002 | Lutzen et al. | 385/62 |
| 2002/0186932 A1 * | 12/2002 | Barnes et al. | 385/78 |
| 2003/0091297 A1 * | 5/2003 | Hung et al. | 385/83 |
| 2004/0037523 A1 * | 2/2004 | Yow et al. | 385/114 |
| 2004/0037534 A1 * | 2/2004 | Yow et al. | 385/137 |
| 2005/0286853 A1 * | 12/2005 | Fujiwara et al. | 385/134 |

FOREIGN PATENT DOCUMENTS

| | | | |
|---|---|---|---|
| JP | 01003614 A * | 1/1989 | |
| JP | 09197195 A * | 7/1997 | |
| JP | 2002162537 A * | 6/2002 | |

* cited by examiner

FIBER OPTIC CONNECTOR

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO A SEQUENCE LISTING, A TABLE, OR A COMPUTER PROGRAM LISTING COMPACT DISC APPENDIX

Not Applicable.

BACKGROUND OF THE INVENTION

This invention relates to fiber optic cable and specifically to connectors for fiber optic cable. Typical fiber optic cable is comprised of several components run together inside a sheathing. First, the cable contains at least one optical fiber, which is contained in a protective tube. Running along side the optical fiber and parallel thereto are reinforcing members and reinforcing fibers or yarns. The reinforcing members are typically fiberglass rods and the reinforcing yarn is typically a strong, synthetic fiber, such as aramid.

To connect a fiber optic cable to a fiber optic device or network component, a hardened fiber optic connector (HFOC) is attached to the end of the cable. These connectors typically terminate in ferrule assemblies enabling the cables to be connected to devices with receptacles dimensioned to receive the connectors and the ferrule assemblies. It is important for the connector to firmly grip the fiber optic cable components so as to avoid a signal disruption.

The connectors of the prior art are typically comprised of a plastic connector body that is divided into two halves. The two halves are assembled in the field around the fiber optic cable components (i.e. the optical fiber in its protective tubing and the reinforcing members that run along side the optical fiber) and the ferrule assembly. That is, both the fiber optic cable components and the ferrule assembly are sandwiched between the halves of the connector body.

With the connectors of the prior art, an adhesive is used to further secure the fiber optic components within the connector body. A crimping sleeve is then brought over and crimped to the connector body to ensure that the halves of the connector body do not separate. Assembling the connector of the prior art, therefore, involves a first and second half of a connector body, a separate ferrule assembly, and the use of an adhesive.

The several component parts of the connectors of the prior art make the assembly of these connectors time-consuming and tedious. The need to use an adhesive greatly exacerbates this problem. Moreover, since the connectors of the prior art are made of plastic, they tend to deteriorate relatively rapidly and loosen their grip on the fiber optic cable components resulting in an ever-increasing likelihood of signal interruption. These signal interruptions can cause enormous problems for the users of the fiber optic network and are expensive to repair.

Accordingly, there is a need for a simpler, more reliable, and more durable connector for fiber optic cables that has fewer parts and does not require the use of an adhesive.

BRIEF SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

According to its major aspects and briefly stated, the present invention is a fiber optic cable connector and a method of installing such a connector. The one-piece body is designed to receive and grip a fiber optic cable in a first end. In the opposing second end, the connector body is designed to house a ferrule assembly. In a preferred embodiment of the present invention, the connector body is preassembled with a ferrule assembly attached to the second end.

In a preferred embodiment of the present invention, the one-piece connector body is substantially cylindrical in shape and has a plurality of longitudinal holes in the first end. The holes in the first end are dimensioned to receive an optical fiber in its protective tubing and the reinforcing members adjacent to the optical fiber. The hole through which the optical fiber passes runs the length of the connector while the holes dimensioned to receive the reinforcing members typically do not run the length of the connector.

The connector body also has a slot in the first end. The slot extends through the entire face of the first end of the connector and longitudinally through a portion of the length of the connector body beginning at the first end. The slot divides the first end and the longitudinal holes (but not the entire connector body) into two halves. The slot permits the halve of the first end, and the holes therethrough, to collapse slightly when the first end is laterally compressed. After the optical fiber in its protective tubing and the reinforcing members are inserted into the connector body, a crimp sleeve is crimped around the connector body. The crimp sleeve compresses the first end of the connector body causing the first end to collapse slightly thereby firmly gripping the reinforcing members. The hole through which the optical fiber passes is sufficiently large that it does not unduly compress the optical fiber's protective tubing when compressed.

Many fiber optic cables contain, in addition to the optical fiber and the reinforcing members, reinforcing fibers or yarn. These fibers are often made of a strong synthetic material such as aramid. In a preferred embodiment of the present invention, after the optical fiber in its protective tubing and the reinforcing members are inserted into the first end of the connector body, but before the crimp sleeve is placed around the connector body, the reinforcing fibers are brought over the connector body. The crimp sleeve is then brought over the connector body and crimped over the reinforcing fibers and connector body.

One feature of the connector of the present invention is that it has fewer parts than the connectors of the prior art. The connectors of the prior art, including that disclosed in U.S. Pat. No. 7,090,406, are of a sandwich-type comprised of two halves. The halves are assembled in the field to trap and grip the reinforcing members at one end and a ferrule assembly at the other end. The connectors of the present invention, in contrast, reduce the three-piece connector (two connector body halves and a ferrule assembly) typical of the prior art to a one-piece connector (a one-piece connector body with an attached ferrule assembly). This reduces the complexity of the connector and makes field-installing the connectors far less time-consuming and tedious.

Note that a pre-installed ferrule assembly is not possible with the two-piece connectors of the prior art. Because the two-piece connectors grip the ferrule assembly only when the halves are assembled, the ferrule assembly cannot be attached to the connectors of the prior art until final assembly of the connector. The one-piece body of the connector of the present invention permits the ferrule assemblies to be attached prior to final assembly.

Another feature of the present invention is a fiber optic connector and a method of installing a fiber optic connector that obviates the need for an adhesive. The connectors of the present invention grip the components of a fiber optic cable sufficiently securely that no additional measures are needed to assure a reliable and permanent connection. The slot that divides the first end of the connector permits that end of the connector to compress slightly when the crimping sleeve is crimped to the connector body. This compression, which causes inelastic deformation of the metal connector, firmly grips the cable components, especially the reinforcing members, making the use of an adhesive unnecessary. Furthermore, if the fiber optic cable also contains reinforcing yarn, the yarn can be folded forward over the connector prior to crimping, which further attaches the cable to the connector body.

Another advantage of the present invention is a connector that has greater long term reliability. Unlike the connectors of the prior art, the connectors of the present invention are made of metal. The connectors of the prior art, which are made of plastic, exhibit crazing, brittleness, and degradation when exposure to environmental stresses (e.g., extreme or cyclic loading, temperature extremes or cycles, or ultraviolet radiation). The connectors of the present invention, however, which have a one-piece metal body, maintain their integrity over the long term regardless of these environmental stresses.

Other features and advantages of the present invention will be apparent to those skilled in the art from a careful reading of the Detailed Disclosure of the Preferred Embodiment presented below and accompanied by the drawings.

BRIEF DESCRIPTION OF THE DRAWINGS

The preferred construction of the invention is illustrated by the accompanying drawings, in which.

DETAILED DESCRIPTION OF THE PREFERRED EMBODIMENT

The present invention is a connector for fiber optic cables. More specifically, the present invention is a connector having a one-piece body and pre-attached ferrule assembly that permits a fiber optic cable to be connectorized without the use of an adhesive.

Figure 1:
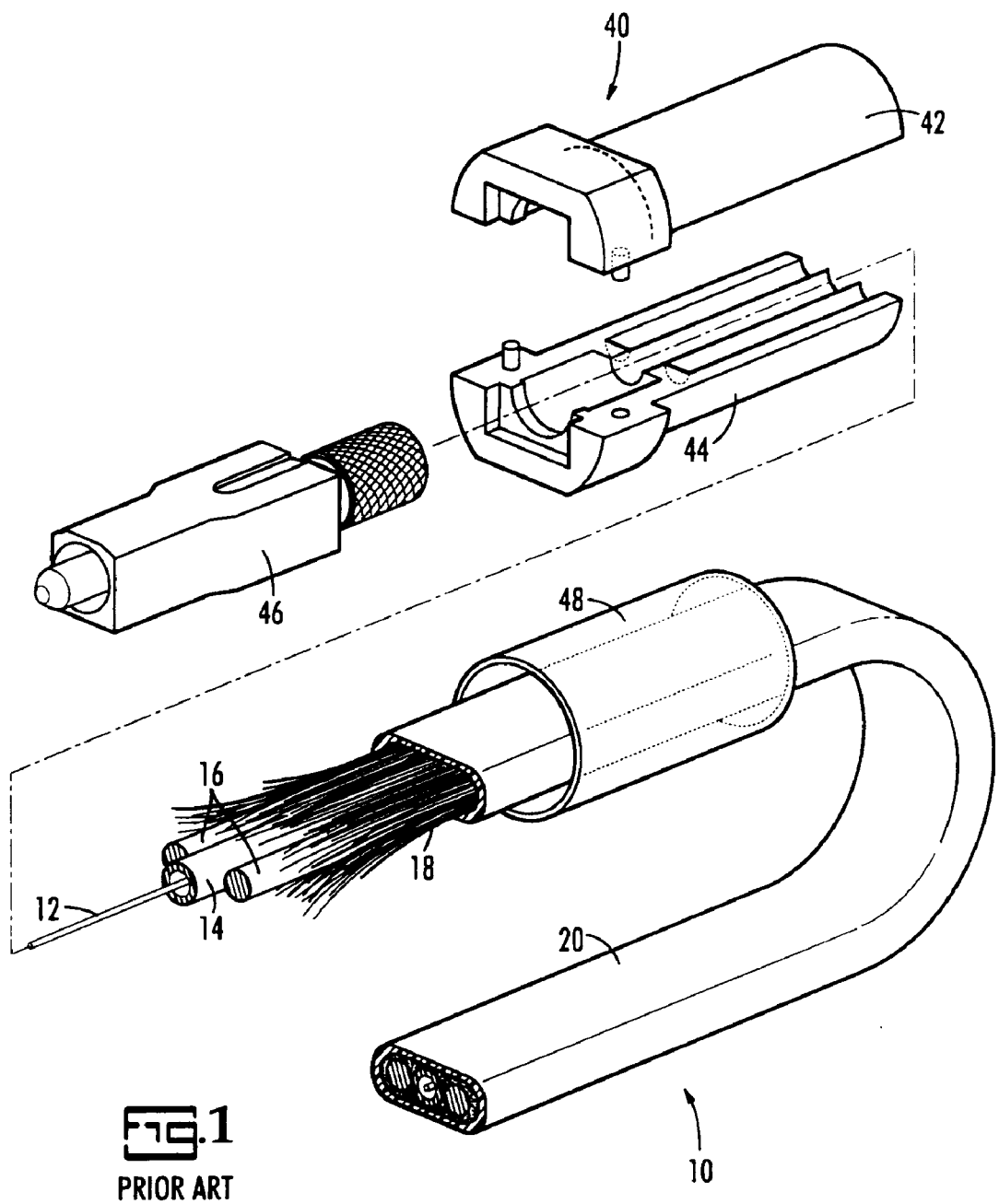
FIG. 1 is a perspective view of a connector of the prior art showing the two-piece body and unattached ferrule assembly.

FIG. 1 shows a typical fiber optic cable 10 and its component parts. In the 10 center of the cable is the optical fiber 12 running through a protective tube 14. On either side of the optical fiber are reinforcing members 16. The reinforcing members 16 contained in fiber optic cables are typically made of a strong and stiff but flexible material such as fiber glass. Running along with the reinforcing members 16 are reinforcing fibers 18. The reinforcing fibers of fiber optic cables are typically made of a synthetic yarn such as aramid yarn. All of these components are covered in a protective sheathing 20. FIG. 1 also shows a typical fiber optic connector 40 of the prior art. The two-piece connector body is comprised of two halves 42 and 44. One end of the connector 40 is dimensioned to receive ferrule assembly 46. The other end is dimensioned to receive the optical fiber 12 in its protective tube 14 and the reinforcement members 16.

In order to connectorized the fiber optic cable 10 in the field, an adhesive must first be applied to the halves 42 and 44 of the connector body. Then, the optical fiber 12 in its protective tube 14 and the reinforcement members 16 must be placed in a first end of a first half 44 of the connector body. While holding the optical fiber 12 and reinforcement members 16 in the first end of the first half 44 of the connector body, ferrule connector 46 must be placed in the second end of the first half 44 of the connector body. Next, while holding the optical fiber 12, reinforcement members 16, and ferrule connection 46 in the first half 44 of the connector body, the second half 42 of the connector body must be carefully mated to the first half 44. The reinforcing fibers 18 are then folded over the halves 42 and 44 of the connector body. Finally, a crimping sleeve 48 is brought around the reinforcing fibers 18 and halves of the connector body 42 and 44 and crimped thereto.

Figure 2:
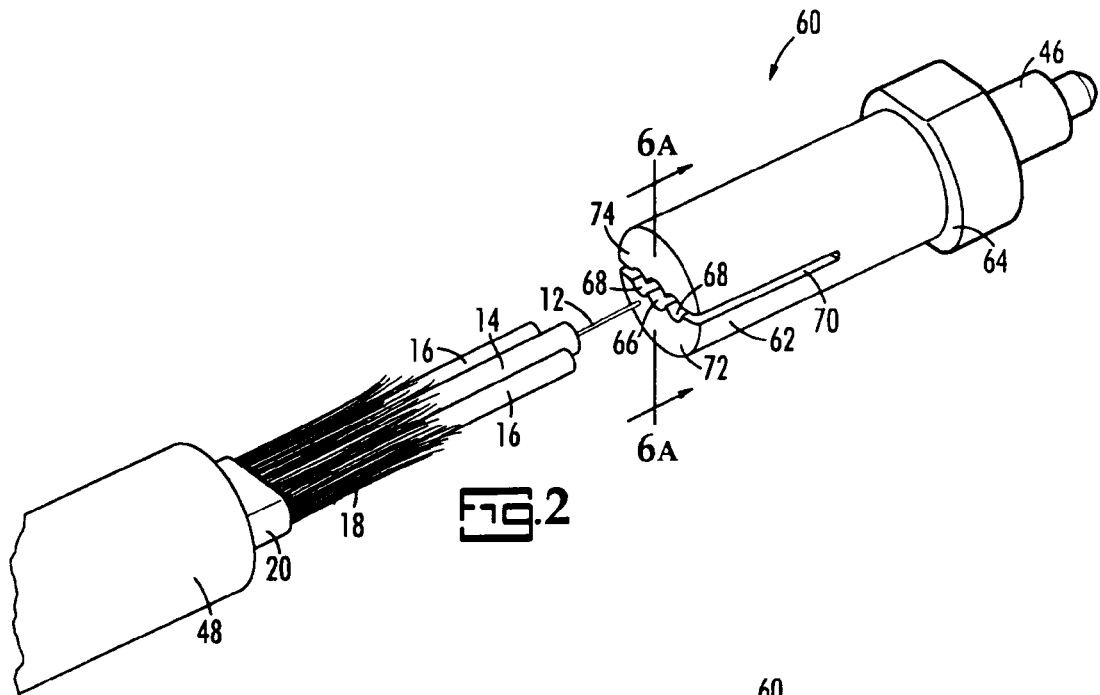
FIG. 2 is a perspective view of a connector of the present invention prior to insertion of the optical fiber and reinforcement members into the connector body.

FIG. 2 shows a fiber optic connector 60 according to a preferred embodiment of the present invention prior to insertion of the fiber optic cable components 12, 14, and 16. The connector body is divided into a first end 62 and a second end 64. First end 62 has a center hole 66 and two outside holes 68 therein. Center hole 66 and outside holes 68 are dimensioned to receive optical fiber 12 in protective tube 14 and reinforcing members 16, respectively. First end 62 also has a slot 70 therein, which divides first end 62 into halves 72 and 74. Slot 70, by providing a space between halves 72 and 74, allows the first end 62 to be laterally compressed. Note that the second end 64 of connector 60 has a ferrule assembly 46 already attached.

In a preferred embodiment of the present invention, the connector 60 is made of metal. Unlike the connectors 40 (FIG. 1) of the prior art, which are made of plastic, the metal connector 60 of the present invention is not prone to the degradation associated with plastics. For example, metal connectors like those of the present invention are not sensitive to ultraviolet light and are stronger and more durable than plastic connectors. Accordingly, notwithstanding swings in temperature and other environmental stresses, the metal connectors of the present invention will not become brittle or crazed and are less likely to fail than those of the prior art. These failures, which cause or increase the likelihood of expensive signal disruptions, are also expensive to repair.

Note also that in this preferred embodiment the holes 66 for the optical fiber 12 and holes 68 for reinforcement members 16, respectively, have centerlines that are substantially parallel and define a plane. Other fiber optic cables have different arrangements of optical fibers and reinforcement members and the present invention is not limited to only cables of the type shown in FIG. 2.

Figure 3:
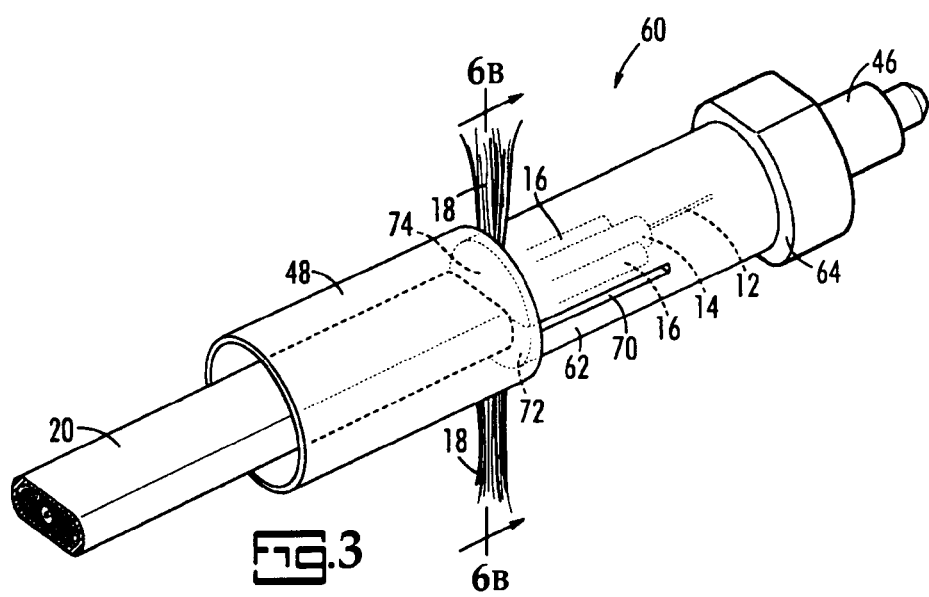
FIG. 3 is a perspective view of the connector of the present invention with the optical fiber and reinforcement members inserted into the connector body.

FIG. 3 shows the connector 60 of the present invention after insertion of the optical fiber 12 in its protective tube 14 and reinforcing members 16 into first end 62. Reinforcing fibers 18 are typically comprised of a synthetic yarn such as aramid yarn. In this embodiment of the present invention, the reinforcing fibers 18 are outside of connector 60 and ready to be draped over connector 60 as the crimping sleeve 48 is brought over the connector 60.

Figure 4:
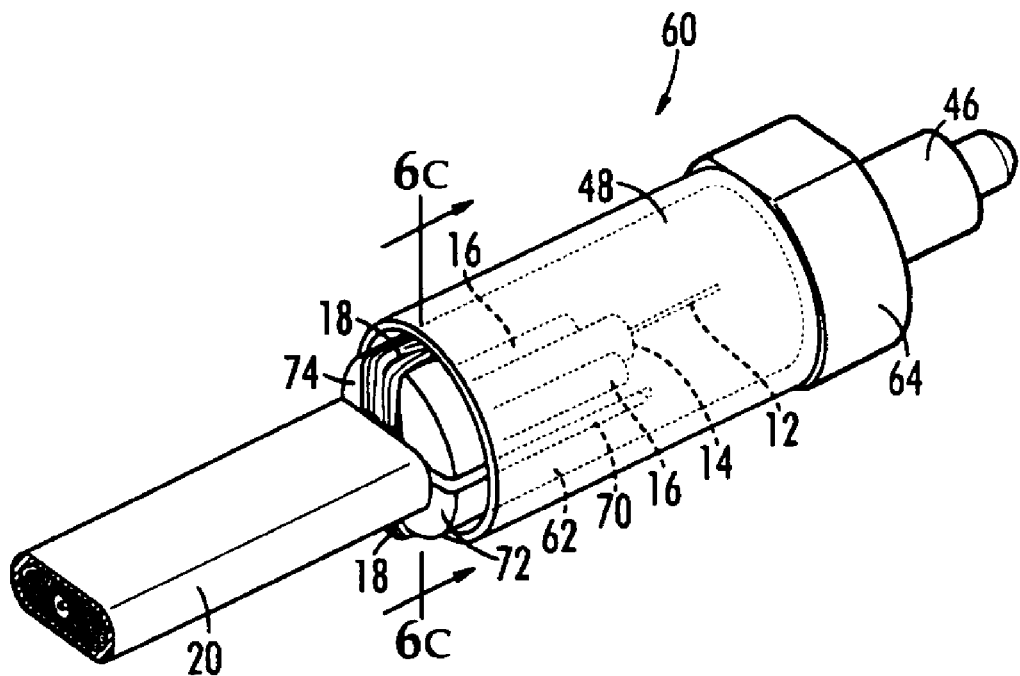
FIG. 4 is a perspective view of the connector of the present invention with the reinforcing fibers folded over the connector body and the crimping sleeve brought into position.
Figure 5:
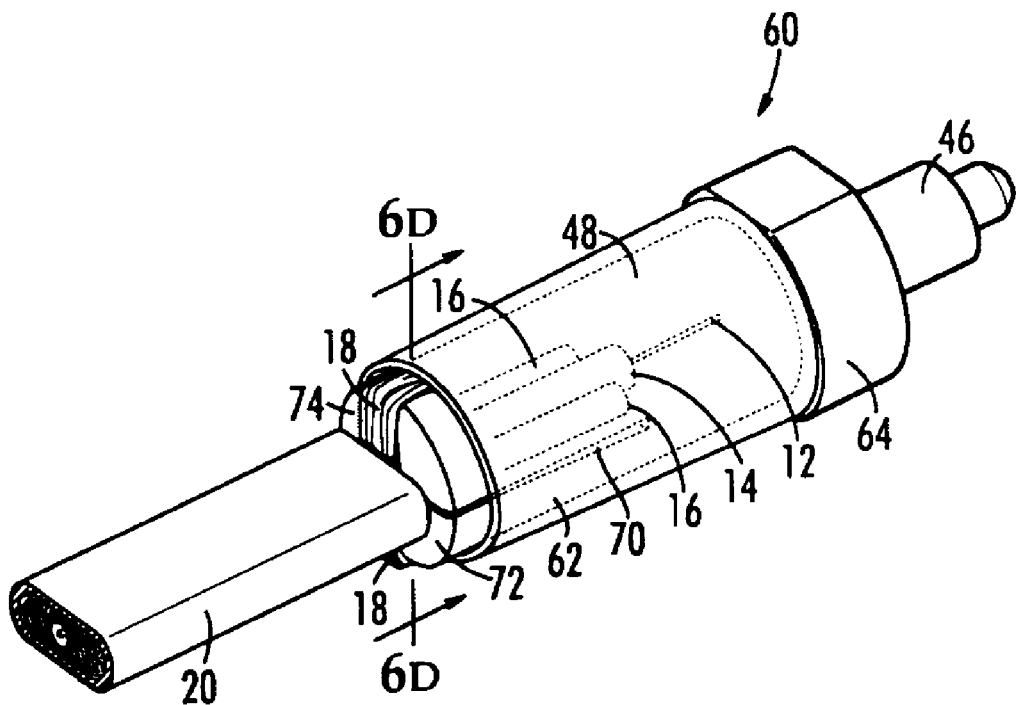
FIG. 5 is a perspective view of the present invention with the crimping sleeve crimped to the connector body.

FIGS. 4 and 5 show the final connector assembly before and after crimping, respectively. FIG. 4 shows the crimping sleeve 48 in place over connector 60 with reinforcing fibers 18 between the crimping sleeve 48 and the connector 60. FIG. 5 shows the same connector 60 after crimping. Compare the width of slot 70 in FIGS. 4 and 5 and note that first end 62 has collapsed slightly in FIG. 5. In this slightly collapsed orientation, reinforcement members 16 are securely gripped between lower half 72 and upper half 74.

Figure 6A:
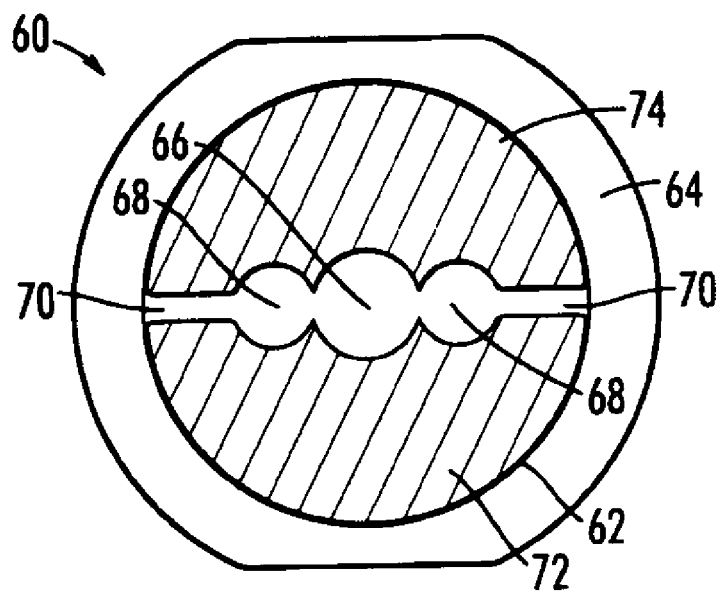
FIG. 6A is a cross-sectional view of the present invention taken at section line 6A-6A of FIG. 2 showing the first end of the connector of the present invention.
Figure 6B:
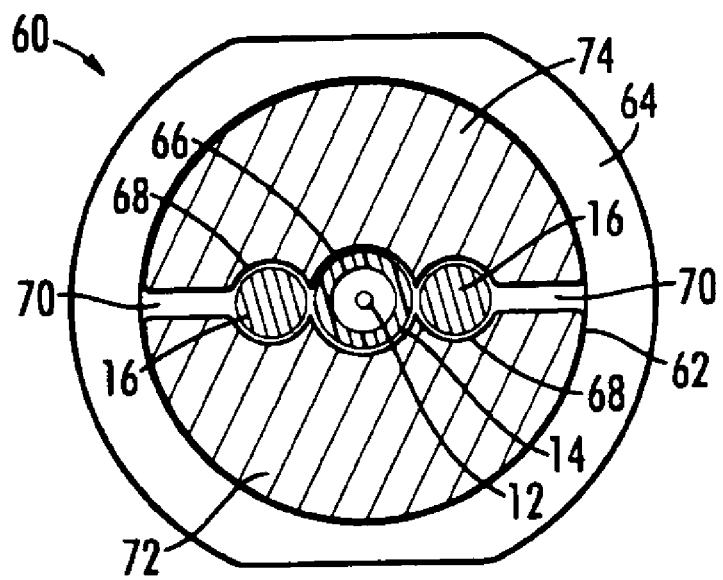
FIG. 6B is a cross-sectional view of the present invention taken at section line 6B-6B of FIG. 3 showing the first end of the connector of the present invention with the optical fiber and reinforcing members inserted therein.
Figure 6C:
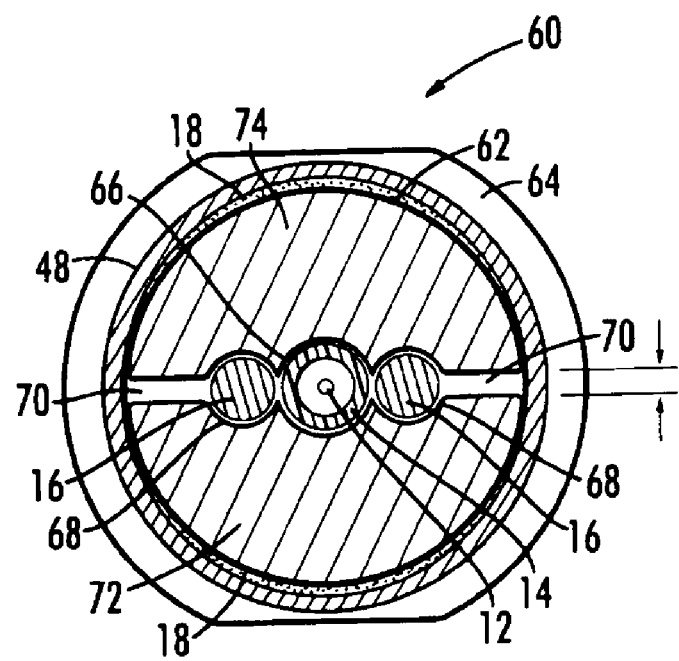
FIG. 6C is a cross-sectional view of the present invention taken at section line 6C-6C of FIG. 4 showing the first end of the connector of the present invention with the optical fiber and reinforcing members inserted therein, the reinforcing fibers extending over the connector body, and the crimping sleeve brought around the connector body.

FIG. 6A is a cross-sectional view of the first end 62 of connector 60 of the present invention. Center hole 66 is dimensioned to receive the optical fiber 12 (FIG. 2) and outside holes 68 are dimensioned to receive reinforcing members 16 (FIG. 2). FIG. 6A also shows slot 70 dividing the first end 62 of connector 60 into lower half 72 and upper half 74. FIG. 6B is a cross-sectional view of the first end 62 of the present invention showing the connector 60 after insertion of the optical fiber 12 in its protective tube 14 and reinforcement members 16. Note that holes 66 and 68 are dimensioned so that the cable components slide easily into the first end 62 of connector 60. FIG. 6C is a cross-section showing the reinforcing fibers 18 and crimping sleeve 48 surrounding the first end 62. The connector in FIG. 6C is ready to be crimped but is not yet crimped and the slot 70 between lower half 72 and upper half 74 is not yet compressed.

Figure 6D:
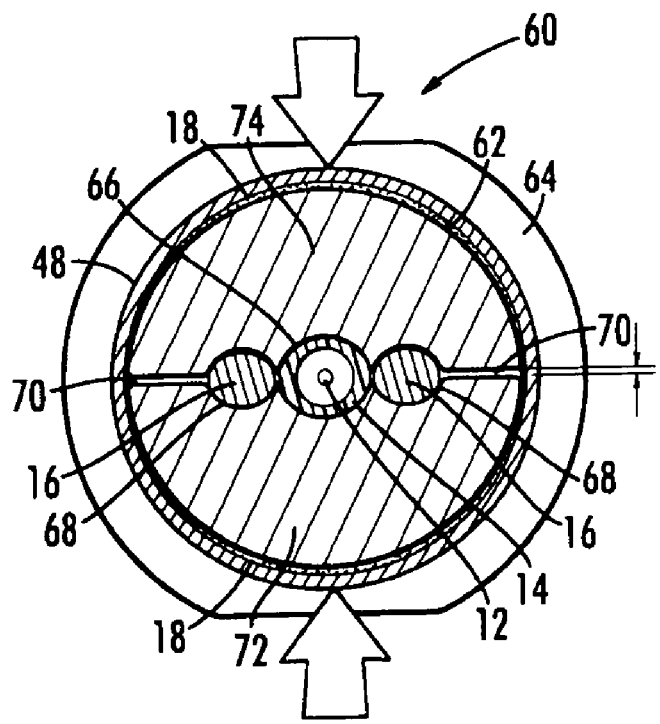
FIG. 6D is a cross-sectional view of the present invention taken at section line 6D-6D of FIG. 5 showing the compressed first end of the connector.

FIG. 6D is a cross-section of the first end 62 of the present invention after the crimping sleeve 48 has been crimped around the connector 60. Slot 70 is now smaller as the lower half 72 and upper half 74 of first end 62 are now compressed. Reinforcing members 16, moreover, are firmly gripped between the lower and upper halves 72 and 74 of first end 62. This enables the connector 60 to be firmly attached to cable 10 (FIG. 1). In addition, note that crimping the crimping sleeve 48 to connector 60 has not displaced or compressed optical fiber 12. Accordingly, the connector 60 of the present is securely attached to the reinforcement members 16 but does not threaten to disrupt the signals transmitted through optical fiber 12.

Because the connector 60 of the present invention is made of metal, moreover, it grips the cable reinforcement members 16 of the cable 10 (FIG. 1) more tightly than would the plastic connectors of the prior art. This is due to the fact that the both the lower and upper halves 72 and 74 of the first end 62 as well as the crimping sleeve 48 are imparting lateral pressure on the reinforcement members 16. With the plastic two-piece connector 40 of the prior art (FIG. 1), the crimping sleeve 48 is the only component imparting lateral pressure and gripping reinforcement members 16. The metal connector 60 of the present invention, however, which undergoes inelastic deformation when crimped, exerts its own lateral pressure on the reinforcement members 16. This enhanced connection obviates the need for the use of an adhesive.

Those skilled in the art of fiber optic cables and connectors will recognize that many substitutions and modifications can be made in the foregoing preferred embodiments without departing from the spirit and scope of the present invention.

What is claimed is:

1. A fiber optic connector, comprising:
   a one-piece connector body having a first end, said first end having a plurality of longitudinal holes therethrough and a slot therein, said slot extending laterally through said first end and said plurality of holes and dividing said first end into two halves;
   a crimping sleeve dimensioned to receive said connector body;
   wherein, when said crimping sleeve is crimped onto said connector body, said first end of said connector body laterally compresses.

2. The fiber optic connector of claim 1 wherein said connector body is made of metal.

3. The fiber optic connector of claim 1 wherein said connector body further comprises a second end and said second end has a ferrule assembly attached thereto.

4. The fiber optic connector of claim 1 wherein said connector body further comprises a second end, said second end being dimensioned so that said crimping sleeve cannot receive said second end.

5. The fiber optic connector of claim 1 wherein said plurality of holes have substantially parallel centerlines.

6. The fiber optic connector of claim 5 wherein said substantially parallel centerlines of said plurality of holes define a plane.

7. The fiber optic connector of claim 1 wherein said plurality of holes are comprised of a center hole and a plurality of outside holes.

8. The fiber optic connector of claim 7 wherein said plurality of outside holes is two holes.

9. The fiber optic connector of claim 7 wherein said center hole is dimensioned to receive an optical fiber in its protective tubing and said plurality of outside holes are dimensioned to receive reinforcement members.

10. The fiber optic connector of claim 7 wherein said center hole extends from said first end through said connector body to said second end.

11. A method of connectorizing a fiber optic cable, said method comprising the steps of:
   inserting an optical fiber and reinforcing members into a first end of a one-piece connector body having longitudinal holes therein dimensioned for receiving said optical fiber and said reinforcing members;
   placing a crimping sleeve over said connector body; and
   crimping said crimping sleeve onto said connector body so that said connector body grips said reinforcing members.

12. The method of claim 11 wherein said first end of said connector body has a slot therein, said slot extending laterally through said holes and dividing said first end into two halves so that when said crimping sleeve is crimped onto said connector body, said first end of said connector body compresses, thereby gripping said reinforcing members.

13. The method of claim 11 wherein said connector body has a second end, said second end having a ferrule assembly attached thereto.

14. The method of claim 11 wherein said connector body is made of metal.

15. The method of claim 11 wherein said reinforcing members are made of fiberglass.

16. A method of connectorizing a fiber optic cable, said method comprising the steps of:
   inserting an optical fiber and reinforcing members into a first end of a one-piece connector body, said first end having longitudinal holes therein and a slot therethrough, said holes dimensioned for receiving said optical fiber and said reinforcing members, said slot extending laterally through said holes and dividing said first end and said holes into two halves;
   folding reinforcing fibers over said connector body;
   placing a crimping sleeve over said reinforcing fibers and said connector body; and
   crimping said crimping sleeve onto said connector body so that said connector body grips said reinforcing members and said reinforcing fibers.

17. The method of claim 16 wherein said connector body is made of metal.

18. The method of claim 16 wherein said reinforcing fibers are synthetic fibers.

19. The method of claim 18 wherein said reinforcing fibers are aramid fibers.

20. The method of claim 16 wherein said reinforcing members are fiberglass rods.

\* \* \* \* \*